(12) United States Patent
Bohlender

(10) Patent No.: US 12,020,099 B2
(45) Date of Patent: Jun. 25, 2024

(54) LABEL WITH RFID FUNCTION

(71) Applicant: Schreiner Group GmbH & Co. KG, Oberschleissheim (DE)

(72) Inventor: Alexander Bohlender, Walpertskirchen (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 0 days.

(21) Appl. No.: 17/900,097

(22) Filed: Aug. 31, 2022

(65) Prior Publication Data
US 2023/0074897 A1 Mar. 9, 2023

(51) Int. Cl.
G06K 19/07 (2006.01)
(52) U.S. Cl.
CPC .................. G06K 19/0723 (2013.01)
(58) Field of Classification Search
CPC .................................. G06K 19/0723
USPC ....................................... 235/492
See application file for complete search history.

(56) References Cited

U.S. PATENT DOCUMENTS

| 2005/0092845 | A1 | 5/2005 | Forster |
| 2005/0093677 | A1 | 5/2005 | Forster et al. |
| 2008/0174434 | A1 | 7/2008 | Strauser et al. |
| 2009/0309703 | A1 | 12/2009 | Forster |
| 2012/0055988 | A1 | 3/2012 | Qu et al. |
| 2013/0293354 | A1 | 11/2013 | Vemagiri et al. |
| 2016/0294060 | A1* | 10/2016 | Meng ............... H01Q 5/378 |
| 2017/0300801 | A1* | 10/2017 | Kai ............... G06K 19/07775 |
| 2018/0040939 | A1 | 2/2018 | Rokhsaz et al. |
| 2018/0351257 | A1 | 12/2018 | Rokhsaz et al. |
| 2022/0180143 | A1* | 6/2022 | Rehm ............... B65D 23/085 |

FOREIGN PATENT DOCUMENTS

| CN | 105956650 A | 9/2016 |
| DE | 10 2007 037293 A1 | 2/2009 |
| WO | 03/025827 A1 | 3/2003 |
| WO | 2007/101840 A1 | 9/2007 |
| WO | 2009/000425 A2 | 12/2008 |
| WO | 2020/200706 A1 | 10/2020 |

OTHER PUBLICATIONS

European Search Report in EP 22192884.9-1205, dated Nov. 21, 2022, with English translation of relevant parts.
German Search Report in DE 10 2021 123 113.2, dated Mar. 31, 2022, with English translation of relevant parts.

* cited by examiner

*Primary Examiner* — Michael G Lee
*Assistant Examiner* — David Tardif
(74) *Attorney, Agent, or Firm* — Collard & Roe, P.C.

(57) ABSTRACT

A label with RFID function comprises a support layer and an RFID inlay with an RFID chip and an antenna connected to the RFID chip. The RFID inlay is arranged on the support layer. The antenna comprises at least one capacitive element on which the resonant frequency of the antenna depends. By adding the at least one capacitive element to the antenna, the read/write range of the RFID inlay can be increased.

10 Claims, 4 Drawing Sheets

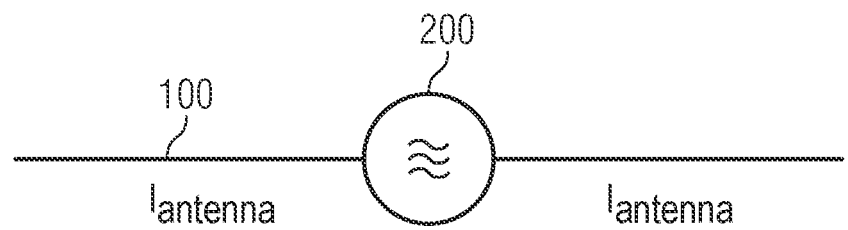
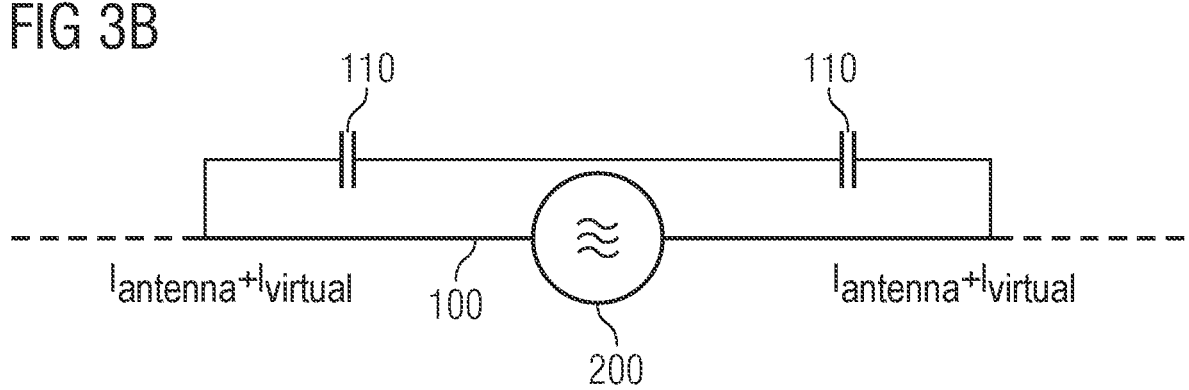

LABEL WITH RFID FUNCTION

CROSS REFERENCE TO RELATED APPLICATIONS

Applicant claims priority under 35 U.S.C. § 119 of German Application No. 10 2021 123 113.2 filed Sep. 7, 2021, the disclosure of which is incorporated by reference.

BACKGROUND OF THE INVENTION

1. Field of the Invention

The invention relates to a label with RFID function suitable to be placed on containers with a material made of plastic and small surface, in particular on a container of medical use.

2. Description of the Related Art

RFID tags enable the electronic storage and wireless transmission of information from products to which the tags are affixed. An RFID label usually has a so-called RFID inlay, which includes an RFID chip (microchip) and an antenna structure connected to the RFID chip. RFID labels on the market are mostly designed to be glued onto glass containers with a relatively large surface area. This applies in particular to the antenna of an RFID inlay, which often has a large length in order to achieve a required read/write range.

Particularly when RFID labels are affixed to small containers made of a plastic material, for example containers made of COP (cyclo-olefin polymers), PP (polypropylene) or COC (cyclo-olefin copolymers), which are filled with a liquid, the known RFID labels in most cases have too short a read/write range for typical applications, for example goods and inventory management, logistical processes or bulk detection. The use of small vessels in conjunction with a label with RFID function, in particular with a UHF antenna structure, is therefore currently not possible or only possible with major restrictions for many applications, for example applications from the medical sector.

SUMMARY OF THE INVENTION

An object of the present invention is to provide a label with RFID function, which is particularly suitable for application to liquid-filled containers made of a plastic material with a small usable surface area.

A label with RFID function usable on a liquid-filled vessel made of a material of plastic with a small usable surface area, and with which a large reading and writing range can be achieved, is disclosed herein.

Such a label with RFID function comprises a support layer and an RFID inlay with an RFID chip and an antenna. The antenna is connected to the RFID chip. The RFID inlay is arranged on the support layer. The antenna has at least one capacitive element on which the resonant frequency of the antenna depends.

The resonant frequency and thus the read/write range of a label with RFID function is largely determined by the geometry and the electrical length of the antenna. By designing the antenna with the at least one capacitive element, the geometric length of the antenna can be virtually extended. In the label according to the invention, the RFID antenna can thus be more compact than comparable antennas in which the actual length of the antenna must be selected to be correspondingly large in order to achieve the required read/write range.

Since the geometric length of the antenna is virtually extended by adding at least one capacitive element to the conductive path of the antenna, the RFID inlay can be realized with a small antenna structure, so that the application of the label with RFID function on small usable surfaces of vessels is possible. In particular, the label with RFID function according to the invention can be arranged on small containers from the medical or pharmaceutical field, for example on vials or syringes. The suitability for small containers filled with liquids, for example water, aqueous solutions, saline solutions, oils, emulsions, etc., should be particularly emphasized.

By virtually extending the electrical length of the antenna by adding at least one capacitive structural element to the remaining conductive path of the antenna in comparison to the geometric length of the conductive path of the antenna, the RFID tag according to the invention is also particularly suitable for application to vessels whose material consists of plastic, in particular COP, PP or COC or combinations thereof.

According to a possible embodiment, the at least one capacitive element may have the form of an interdigital structure. For example, the at least one capacitive element may take the form of an interdigital capacitor. In the label according to the invention, the interdigital structure of such a capacitor can be specifically optimized with respect to the application on liquid-filled COC/COP vessels with small usable surfaces.

The at least one capacitive element can have different geometries depending on the requirements, for example conductive layers consisting of one or more straight, jagged or wavy lines arranged in the form of interdigital structures on the support layer. The layers of conductive material may be printed on the support layer or deposited by an etching process. According to another embodiment, the at least one capacitive element may be laminated to the support layer from a layer sequence of multiple layers of conductive and insulating material. Furthermore, the use of discrete components, for example SMD capacitors, for the at least one capacitive element is possible. A discrete component can be connected to the antenna's conductive path for virtual extension of the antenna.

Embodiments of the label with RFID function as well as possible vessels for applying the label according to the invention are explained in more detail below with reference to the drawing figures.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 3A shows an equivalent circuit of a dipole antenna without capacitive elements, FIG. 3B shows an equivalent circuit of a dipole antenna with capacitive elements for virtual extension of the geometric length of an antenna.

DETAILED DESCRIPTION OF PREFERRED EMBODIMENTS

Figure 1:
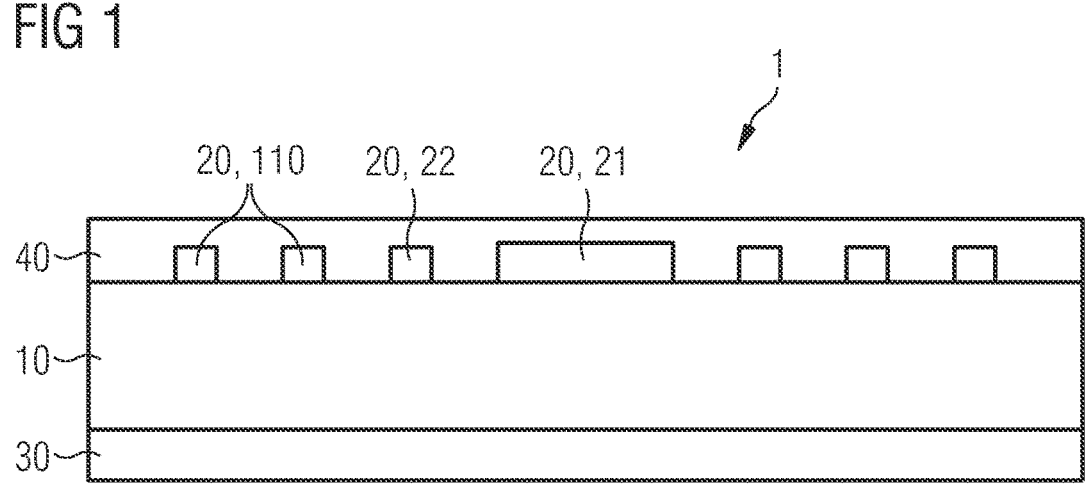
FIG. 1 shows a cross-section through an embodiment of a label with RFID function.

FIG. 1 shows a cross-section through a label 1 with RFID function with a support layer 10 and an RFID inlay 20 arranged on the support layer 10. The RFID inlay 20 comprises an RFID chip 21 and an antenna 22 connected to the RFID chip 21. In particular, the antenna 22 may be configured as a UHF antenna. The label 1 may be adhered to an object, for example, by means of an adhesive layer 30 disposed on a lower surface of the support layer 10. A protective layer 40 for protecting the RFID inlay 20 may be optionally arranged on the upper side of the support layer 10, on which the RFID inlay 20 is disposed.

The antenna 22 has at least one capacitive element 110. The antenna 22 is thereby configured such that, in the label according to the invention, the resonant frequency of the antenna and thus also the read/write range of the RFID inlay 20 is dependent on the at least one capacitive element 110. By connecting the at least one capacitive element to a conductive path of the antenna, the read/write range of the RFID label can thus be influenced and, in particular, increased.

Figure 2:
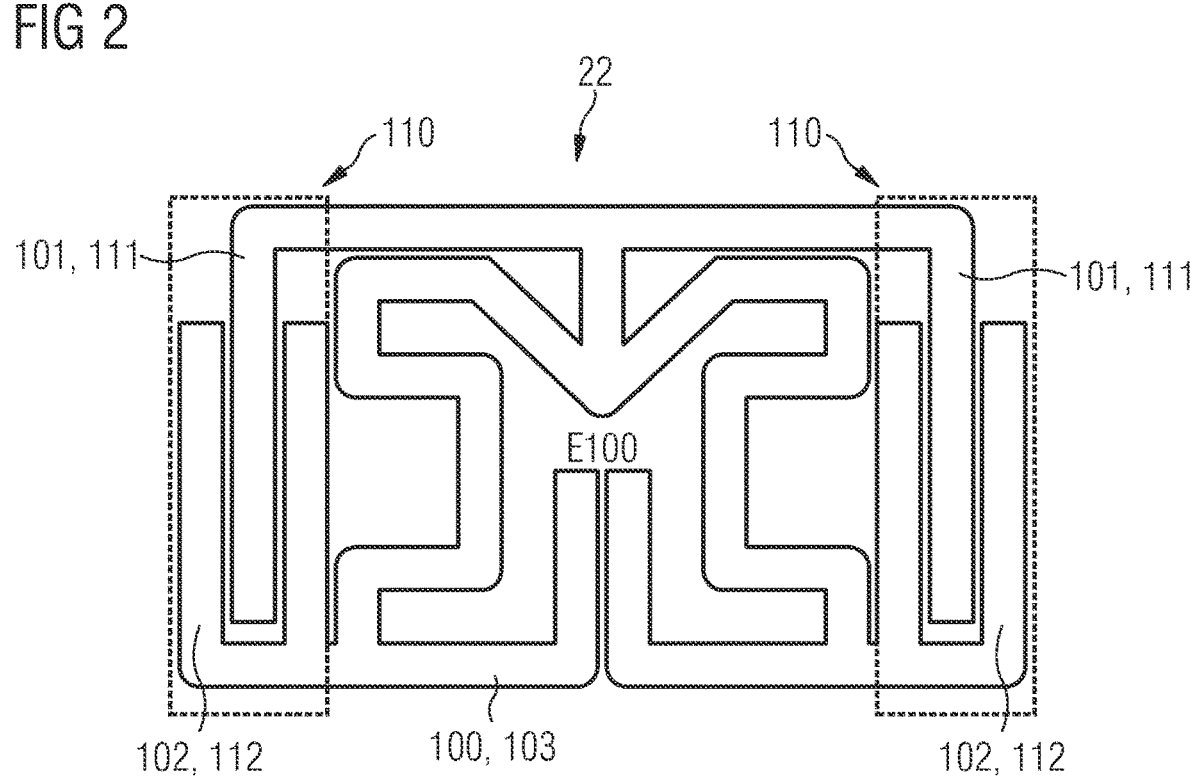
FIG. 2 shows an embodiment of an antenna for an RFID inlay with a capacitive element for virtual extension of the geometric length of the antenna.

FIG. 2 shows a top view of the antenna 22 disposed on the top surface of the support layer 10. The antenna 22 comprises a conductive path 100 and at least one capacitive element 110. The conductive path 100 is connected at one end E100 to the RFID chip 21 and at an opposite end to the at least one capacitive element 110. In the embodiment of FIG. 2, capacitive elements 110 are connected to both sides of the conductive path 100, so that the antenna 22 in the embodiment shown has two capacitive structures.

The at least one capacitive element 110 may include at least one first conductive layer 111 and at least one second conductive layer 112, according to an example embodiment shown in FIG. 2. The at least one second conductive layer 112 is spaced apart from the at least one first conductive layer 111. In the embodiment of FIG. 2, the at least one first conductive layer 111 is formed as a first portion 101 of the conductive path 100 of the antenna 22. The at least one second conductive layer 112 is formed as a second portion 102 of the conductive path 100. In the embodiment shown in FIG. 2, the conductive layers 111 and 112 of the at least one capacitive element 110 intermesh with each other in a finger shape, thereby forming a capacitor and a capacitive structure, respectively.

The conductive path 100 of the antenna 22 includes a third portion 103 that is for matching purposes. The third portion 103 of the conductive path 100 is connected at the end E100 of the conductive path 100 to the RFID chip, which is not shown in FIG. 2. The at least one capacitive element 110 is connected to the end of the third portion 103 of the conductive path 100 opposite to the end E100.

The principle of extending the read/write range of the RFID inlay by connecting capacitive structures to the conductive path 100 of the antenna 22 is explained clearly below with reference to FIGS. 3A and 3B. FIG. 3A shows a simple dipole antenna for this purpose with a voltage source 200 and a conductive path 100 of an antenna of geometric length $I_{antenna}$ connected to the exciting voltage source 200. The resonant frequency and thus the range of the dipole antenna is largely determined by the geometry and in particular the geometric length $I_{antenna}$ of the conductive path 100 of the antenna.

FIG. 3B shows a modified dipole antenna with a voltage source 200 and a conductive path 200 with the geometric length $I_{antenna}$, to which capacitive elements 110 are added. In the example of FIG. 3B, two capacitive elements/capacitors are arranged in parallel to the conductive path 100.

By providing the capacitive elements 110, it is possible to virtually extend the electrical length of the antenna compared to the geometric length. The total length of the antenna, which determines its resonant frequency and thus, in the case of an RFID inlay, the read/write range of the RFID inlay, results from the actual geometric length $I_{antenna}$ of the electrical conductive path 100 and a virtual extension $I_{virtual}$, which is generated by the capacitive elements 110. The actual geometric length $I_{antenna}$ of the conductive path 100 is thus virtually extended by the length $I_{virtual}$ drawn in dashed lines in FIG. 3B.

This means that the resonant frequency of the dipole antenna shown corresponds to a dipole antenna with a conductive path of the total length $I_{antenna}+I_{virtual}$. In the case of an RFID inlay, the RFID antenna can be more compact than comparable antennas without capacitive elements, which would have to be significantly longer to achieve the same read/write range, by connecting at least one capacitive element.

Figure 4A:
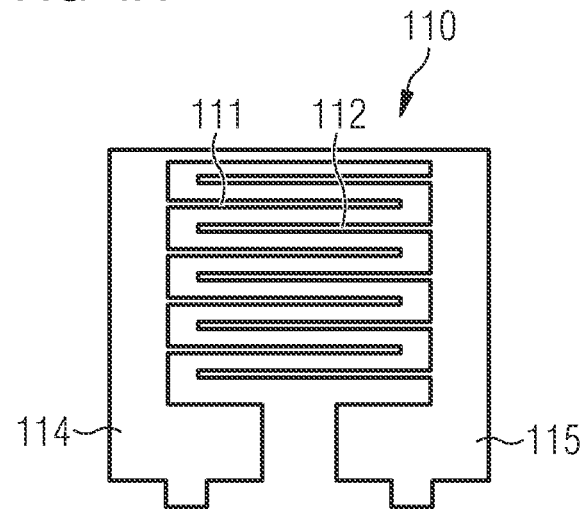
FIG. 4A shows an embodiment of a capacitive element as an interdigital capacitor for virtual extension of the geometric length of an antenna of an RFID inlay.
Figure 4B:
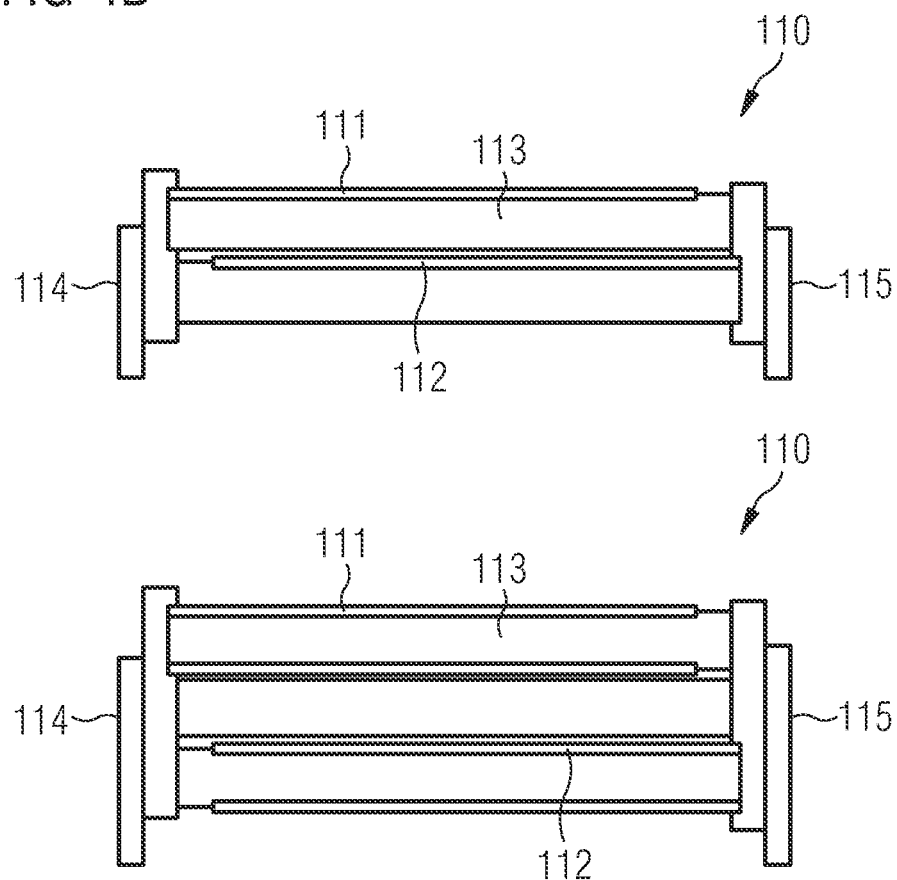
FIG. 4B shows an embodiment of a capacitive element comprised of several conductive and electrically insulating layers arranged on top of each other to virtually extend the geometric length of an antenna of an RFID inlay.

FIGS. 4A and 4B illustrate possible embodiments for implementing the at least one capacitive element 110 to achieve the virtual extension of the conductive path 100 of the antenna 22.

In the embodiment shown in FIG. 4A, the capacitive element 110 is formed as an interdigital capacitor. The capacitive element 110 includes first conductive layers 111 and second conductive layers 112 that are spaced apart from the first conductive layers 111. The conductive layers 111 and 112 interdigitate in the form of fingers and combs, respectively. In addition to the straight lines of the conductive layers 111, 112 shown in FIG. 4A, these layers can also be designed, for example, as jagged or wavy lines. The conductive layers 111, 112 can be printed or etched onto the support layer 10.

The capacitive element 110 has a first contacting element 114 connected to the first conductive layers 111 and a second contacting element 115 connected to the second conductive layers 112. Such an interdigital capacitor can be used as a capacitive element in the antenna structure shown in FIG. 2 by connecting the first and second contacting elements 114, 115 to the third portion 103 of the conductive path 100 of the antenna 22.

FIG. 4B shows in a cross-sectional view further embodiments of capacitive elements for virtual extension of the conductive path of an RFID antenna.

As shown in the upper image of FIG. 4B, the capacitive element may include at least one first conductive layer 111 and at least one second conductive layer 112. The at least one second conductive layer 112 is spaced apart from the at least one first conductive layer 111. Further, the capacitive element 110 comprises at least one electrically insulating layer 113 disposed between the at least one first conductive layer 111 and the at least one second conductive layer 112. The at least one capacitive element 110 further comprises a first contacting element 114 and a second contacting element 115. The first contacting element 114 is connected to the at least one first conductive layer 111. The second contacting element 115 is connected to the at least one second conductive layer 112.

FIG. 4B shows, in addition to the simple embodiment of a capacitive element with only a first and second conductive layer shown in the upper figure, a further embodiment of a capacitive element 110 in which a plurality of the at least one first and second conductive layer 111, 112 and the at least one electrically insulating layer 113 are arranged one above the other in the lower figure.

To realize the capacitive element according to the embodiment shown in FIG. 4B, the conductive layers 111, 112 and the insulating layers 113 arranged therebetween can be laminated on top of each other on the support layer 10.

Instead of applying individual layers to the support layer 10, the at least one capacitive element can be formed as a discrete component, for example as an SMD capacitor, according to a further embodiment. The discrete component may also have the structure shown in FIG. 4B of electrically conductive and insulating layers which can be contacted by laterally arranged contacting elements with the third portion 103 of the conductive path 100 of FIG. 2.

Since the label according to the invention with RFID function can achieve a large read/write range with a short geometric length of the antenna 22, the label 1 is suitable for application to small vessels, in particular vessels with a small usable surface. Possible vessels for sticking the label 1 are the syringe shown in FIG. 5A, for example a 1 ml syringe, or the vial shown in FIG. 5B, for example a 2r vial.

Figure 5A:
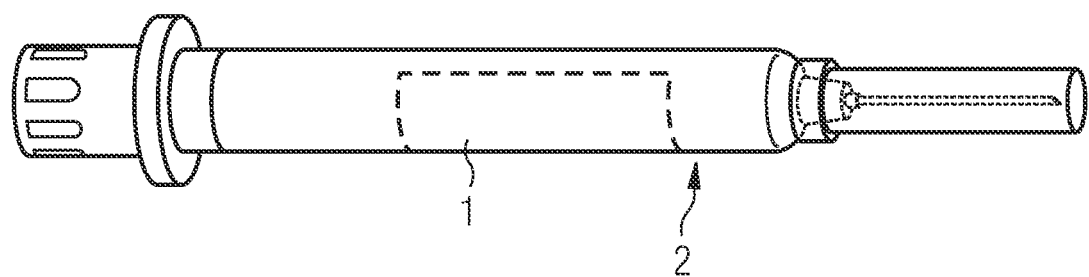
FIG. 5A shows a vessel labeled with a label with RFID function in an embodiment as a syringe.
Figure 5B:
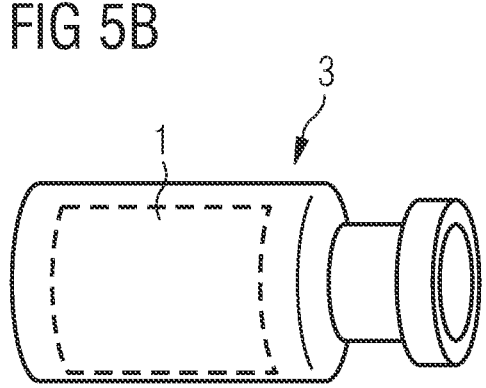
FIG. 5B shows a vessel labeled with a label with RFID function in an embodiment as a vial.

In addition to the vessels shown in FIGS. 5A and 5B, the label 1 with RFID function is particularly suitable for placement on liquid-filled vessels, for example, on vessels filled with water, aqueous solutions, saline solutions, oils, emulsions, etc. Furthermore, the label 1 with RFID function is particularly suitable for placing on vessels made of a material made of plastic, in particular made of COC or PP or COP or combinations thereof.

When the label with RFID function is used on containers with pharmaceutical content, the use of the RFID label enables, in particular, smooth and error-free medication management, which, for example, enables inventory monitoring in hospitals or pharmacies, ensures availability and thus helps to guarantee patient safety requirements.

Although only a few embodiments of the present invention have been shown and described, it is to be understood that many changes and modifications may be made thereunto without departing from the spirit and scope of the invention.

LIST OF REFERENCE SIGNS 1 label with RFID function
2 syringe
3 vial
10 support layer
20 RFID inlay
21 RFID chip
22 antenna
30 adhesive coating
40 protective layer
100 conductive path
101, 102, 103 portions of the conductive path
110 capacitive element
111 first conductive layer
112 second conductive layer
113 electrically insulating layer
114, 115 contacting element

What is claimed is:

1. A label with RFID function, comprising:
a support layer,
an RFID inlay having an RFID chip and an antenna connected to the RFID chip,
wherein the RFID inlay is disposed on the support layer,
wherein the antenna comprises at least one capacitive element on which the resonant frequency of the antenna is dependent,
wherein the at least one capacitive element comprises at least one first conductive layer and at least one second conductive layer spaced apart from the at least one first conductive layer,
wherein the antenna comprises a conductive path having two ends connected to the RFID chip,
wherein the at least one first conductive layer is formed as a first portion of the conductive path and the at least one second conductive layer is formed as a second portion of the conductive path,
wherein the conductive path comprises a third portion,
wherein the third portion of the conductive path is connected between the two ends of the conductive path to the RFID chip,
wherein the at least one capacitive element is connected to the third portion of the conductive path, and
wherein the first portion of the conductive path and the second portion of the conductive path are connected to different locations of the third portion of the conductive path.

2. The label according to claim 1,
wherein the at least one capacitive element comprises at least one electrically insulating layer disposed between the at least one first conductive layer and the at least one second conductive layer.

3. The label according to claim 1,
wherein the at least one capacitive element comprises a first contacting element and a second contacting element,
wherein the first contacting element is connected to the at least one first conductive layer and the second contacting element is connected to the at least one second conductive layer.

4. The label according to claim 2,
wherein the at least one capacitive element comprises a plurality of the at least one first and second conductive layers and the at least one electrically insulating layer disposed one above the other.

5. The label according to claim 1,
wherein the at least one capacitive element is formed as an interdigital capacitor.

6. The label according to claim 1,
wherein the antenna is embodied as a UHF antenna.

7. A labeled vessel with RFID functionality for holding a liquid, comprising:
a label with RFID function according to claim 1, which is arranged on a surface of the vessel.

8. The labeled vessel according to claim 7,
wherein the vessel comprises a material of plastic.

9. The labeled vessel according to claim 7,
wherein the vessel is embodied to hold a liquid.

10. A labeled container according to claim 7, wherein the vessel is formed as a vial or a syringe.

\* \* \* \* \*